(No Model.)
B. BECKER.
CIGAR MAKERS' BOARD.
No. 245,435.  Patented Aug. 9, 1881.
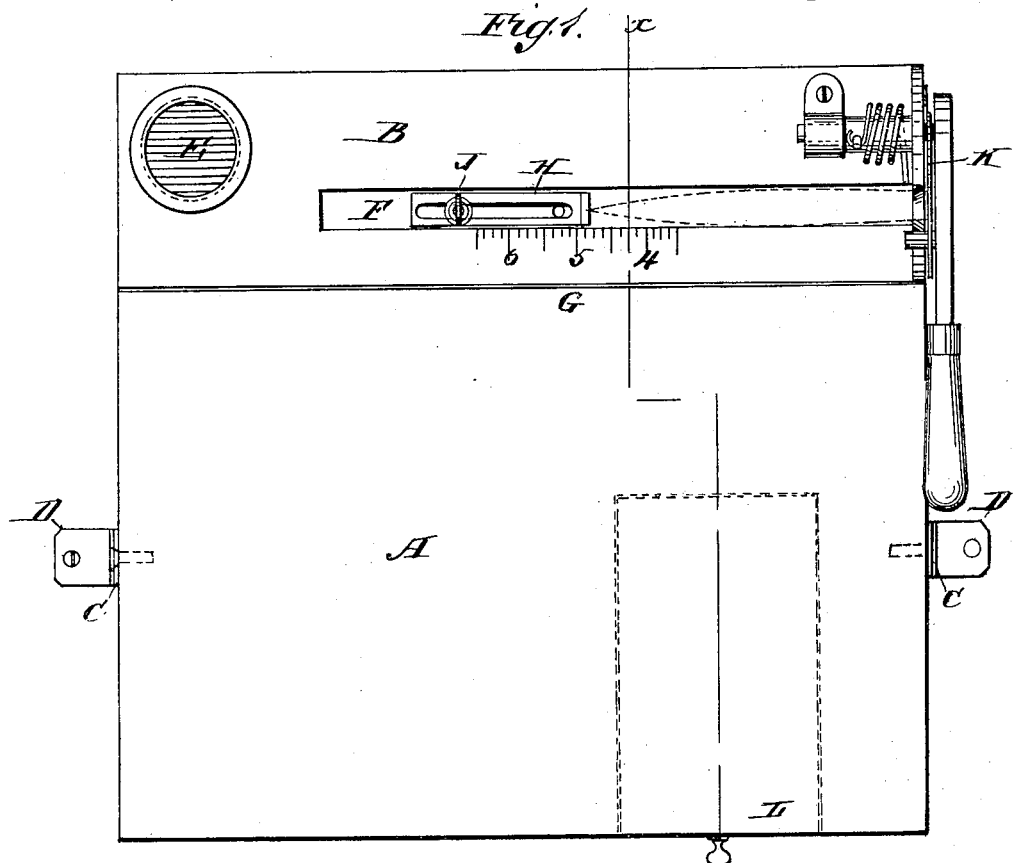
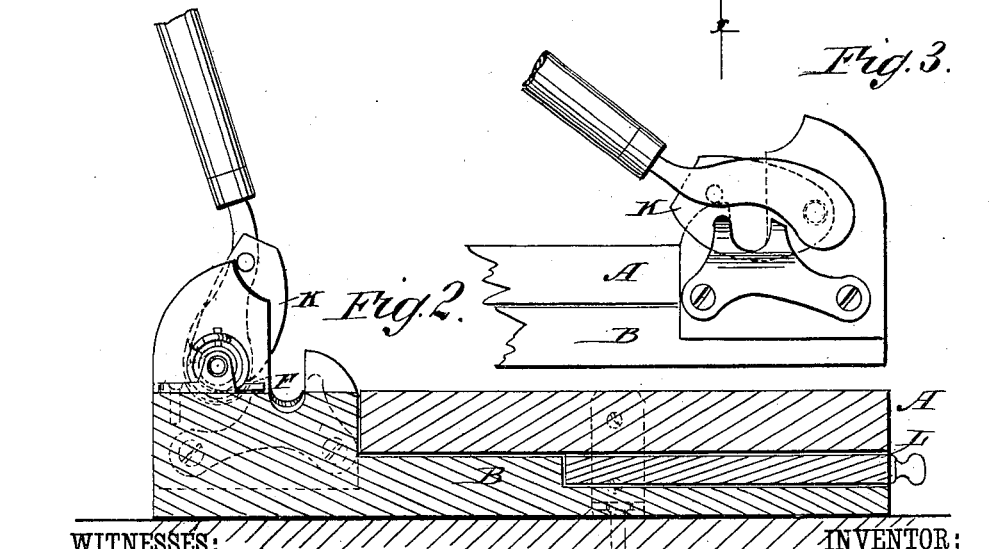
WITNESSES:
Francis McArdle
C. Sedgwick
INVENTOR:
B. Becker
BY Munn & Co
ATTORNEYS.

UNITED STATES PATENT OFFICE.

BERNHARD BECKER, OF NEW YORK, N. Y., ASSIGNOR TO HIMSELF AND E. C. ADEN, OF SAME PLACE.

CIGAR-MAKER'S BOARD.

SPECIFICATION forming part of Letters Patent No. 245,435, dated August 9, 1881.

Application filed June 8, 1881. (No model.)

*To all whom it may concern:*

Be it known that I, BERNHARD BECKER, of the city, county, and State of New York, have invented a new and Improved Cigar-Maker's Board, of which the following is a specification.

The object of my invention is to furnish a new and improved cigar-maker's working board or table, which is handy and compact and can be transported very conveniently.

In the accompanying drawings, Figure 1 is a plan view of my improved cigar-maker's board. Fig. 2 is a cross-sectional elevation of the same on the line $x x$, Fig. 1; and Fig. 3 is an end elevation of the cigar-cutting knife.

The board A, upon which the cigar-wrapper is cut, rests on or in a base-plate, B, and is held thereto by means of removable clips C, provided with a horizontal flange, D, through which a screw is passed to hold the base-plate to a table. The base-plate B is provided with a recess or hole for receiving a paste-pot, E, and with a groove, F, extending to the right-hand end of the base-plate. The edge of this groove is provided with a scale, G, for adjusting the position of the gage H, which can be held in any desired position in the groove F by means of the set-screw J.

A cigar-cutting knife, K, of the well-known construction, is pivoted to the side of the base-plate B in such a manner that this knife cuts off the end of a cigar projecting from the end of the groove F.

A cigar-rolling board, L, is contained in a recess in the upper surface of the base-plate, and below the board A, and can be withdrawn whenever it is to be used.

If the upper surface and front edge or part of the board are cut up to such an extent that the tobacco cannot well be cut thereon, the board A is removed or inverted and is then again secured on the base-frame.

The cigar is rolled on the rolling-board L, and is then placed in the groove F with its point against the gage H, and the projecting end is cut off by means of the knife K.

The gage H can be adjusted so that the cigar can be cut to any desired length.

Having thus described my invention, I claim as new and desire to secure by Letters Patent—

A device for cigar-makers' use consisting of the board A, base-plate B, gage H, knife K, and rolling-board L, the base-plate B being connected by clips C with the board and provided with the groove F, extending to the right-hand end thereof, and having a rolling-board recess in the upper surface, as shown and described.

BERNHARD BECKER.

Witnesses:
OSCAR F. GUNZ,
C. SEDGWICK.